US011404189B2

(12) United States Patent
Okubo et al.

(10) Patent No.: US 11,404,189 B2
(45) Date of Patent: Aug. 2, 2022

(54) NON-ORIENTED ELECTRICAL STEEL SHEET AND METHOD FOR MANUFACTURING THE SAME (71) Applicant: JFE STEEL CORPORATION, Tokyo (JP)

(72) Inventors: Tomoyuki Okubo, Tokyo (JP); Yoshiaki Zaizen, Tokyo (JP); Masanori Uesaka, Tokyo (JP); Yoshihiko Oda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 186 days.

(21) Appl. No.: 16/617,262

(22) PCT Filed: May 8, 2018

(86) PCT No.: PCT/JP2018/017716
§ 371 (c)(1),
(2) Date: Nov. 26, 2019

(87) PCT Pub. No.: WO2018/221126
PCT Pub. Date: Dec. 6, 2018

(65) Prior Publication Data
US 2021/0159002 A1 May 27, 2021

(30) Foreign Application Priority Data
May 31, 2017 (JP) .............. JP2017-107588

(51) Int. Cl.
*C21D 9/46* (2006.01)
*H01F 1/16* (2006.01)
*C21D 6/00* (2006.01)
*C21D 8/12* (2006.01)
*C22C 38/00* (2006.01)
*C22C 38/02* (2006.01)
*C22C 38/04* (2006.01)
*C22C 38/06* (2006.01)
*H01F 1/147* (2006.01)

(52) U.S. Cl.
CPC ............. *H01F 1/16* (2013.01); *C21D 6/008* (2013.01); *C21D 8/1205* (2013.01); *C21D 8/1233* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *H01F 1/147* (2013.01)

(58) Field of Classification Search
CPC ..................................................... C21D 9/46
See application file for complete search history.

(56) References Cited

U.S. PATENT DOCUMENTS

| | | | |
|---|---|---|---|
| 7,922,834 B2 | 4/2011 | Tanaka et al. | |
| 9,466,411 B2 * | 10/2016 | Oda | C22C 38/24 |
| 9,767,946 B2 * | 9/2017 | Zaizen | H01F 1/16 |
| 10,026,534 B2 * | 7/2018 | Toda | C22C 38/002 |
| 11,104,973 B2 * | 8/2021 | Zaizen | C21D 8/1222 |
| 11,136,645 B2 * | 10/2021 | Zaizen | C21D 8/1272 |
| 2011/0273054 A1 | 11/2011 | Johnston | |
| 2014/0227127 A1 | 8/2014 | Natori et al. | |
| 2014/0345751 A1 * | 11/2014 | Oda | C21D 9/46 148/301 |
| 2014/0366988 A1 | 12/2014 | Dorninger et al. | |
| 2015/0187475 A1 | 7/2015 | Zaizen et al. | |
| 2015/0348686 A1 | 12/2015 | Toda et al. | |
| 2016/0020007 A1 | 1/2016 | Oda et al. | |
| 2017/0194082 A1 | 7/2017 | Murakami et al. | |
| 2017/0260600 A1 | 9/2017 | Okubo et al. | |
| 2018/0066333 A1 | 3/2018 | Nakajima et al. | |

FOREIGN PATENT DOCUMENTS

| | | |
|---|---|---|
| CN | 103498096 A | 1/2014 |
| CN | 103667879 A | 3/2014 |
| EP | 2 960 352 A1 | 12/2015 |
| EP | 2 975 147 A1 | 1/2016 |
| EP | 2 977 480 A1 | 1/2016 |
| JP | S57-47830 A | 3/1982 |

(Continued)

OTHER PUBLICATIONS

ASTM A1086-20, Standard Specification for Thin-Gauge Nonoriented Electrical Steel Fully Processed Types, ASTM International (Year: 2020).*
Jan. 8, 2020 Office Action issued in Japanese Patent Application No. 2017-107588.
Apr. 21, 2021 Office Action issued in Korean Patent Application No. 10-2019-7033939.
Jan. 3, 2019 Office Action issued in Taiwanese Patent Application No. 107117141.
Jul. 17, 2018 Search Report issued in International Patent Application No. PCT/JP2018/017716.
Dec. 4, 2020 Office Action and Search Report issued in Chinese Patent Application No. 201880035197.9.

(Continued)

*Primary Examiner* — Jophy S. Koshy
(74) *Attorney, Agent, or Firm* — Oliff PLC (57) ABSTRACT

A non-oriented electrical steel sheet produced by hot rolling a steel slab containing, by mass %, C: not more than 0.0050, Si: 3.2 to 4.5%, Mn: 0.1 to 2.0%, P: not more than 0.020%, As: not more than 0.0030%, Sn+Sb: 0.005 to 0.10%, and one or two elements selected from Mo and W by a content ranging from 0.0020 to 0.10% in total, subjecting the resultant steel sheet to one cold rolling or two or more cold rollings including an intermediate annealing therebetween to achieve a final sheet thickness, and then subjecting the cold rolled sheet to finish annealing, a $N_2$ content in an atmosphere in the finish annealing is set to not more than 20 vol %, and average strain rate in the first pass is set to not more than 4/sec, allowing the cold rolling property to improve with no degradation in magnetic property and no decrease in productivity.

8 Claims, 2 Drawing Sheets

(56) References Cited

FOREIGN PATENT DOCUMENTS

| | | |
|---|---|---|
| JP | H03-229821 A | 10/1991 |
| JP | H11-181577 A | 7/1999 |
| JP | 2970436 B2 | 11/1999 |
| JP | 2001-131717 A | 5/2001 |
| JP | 2001-323344 A | 11/2001 |
| JP | 2006-131963 A | 5/2006 |
| JP | 2006-213975 A | 8/2006 |
| JP | 2007-247047 A | 9/2007 |
| JP | 2008-50686 A | 3/2008 |
| JP | 2011-91936 A | 5/2011 |
| JP | 2011-179027 A | 9/2011 |
| JP | 2013-010982 A | 1/2013 |
| JP | 2016-138316 A | 8/2016 |
| JP | 2016-151050 A | 8/2016 |
| JP | 2016-151063 A | 8/2016 |
| JP | 2018-21242 A | 2/2018 |
| KR | 10-2014-0044929 A | 4/2014 |
| KR | 10-2014-0060727 A | 5/2014 |
| KR | 10-2016-0078081 A | 7/2016 |
| TW | 201439336 A | 10/2014 |
| WO | 2013/046661 A1 | 4/2013 |
| WO | WO-2013046661 A1 * | 4/2013 ............. C22C 38/34 |
| WO | 2013/146879 A1 | 10/2013 |
| WO | 2014/030512 A1 | 2/2014 |
| WO | 2014/129106 A1 | 8/2014 |
| WO | 2014/142149 A1 | 9/2014 |
| WO | 2016/002904 A1 | 1/2016 |
| WO | 2016/017263 A1 | 2/2016 |
| WO | 2016/0132753 A1 | 8/2016 |

OTHER PUBLICATIONS

Apr. 1, 2020 Extended Search Report issued in European Patent Application No. 18810011.9.
Jan. 7, 2022 Office Action issued in Chinese Patent Application No. 201880035197.9.
Special Steel Series, Electrical Steel, pp. 294-296, May 2012.
Mar. 10, 2017 Office Action issued in U.S. Appl. No. 14/418,351.
Apr. 6, 2021 Office Action issued in U.S. Appl. No. 16/483,965.
Apr. 14, 2021 Office Action issued in U.S. Appl. No. 16/486,121.
Paolinelli et al.; "Effect of stress relief annealing temperature and atmosphere on the magnetic properties of silicon steel;" Journal of Magnetism and Magnetic Materials; 2006; pp. e599-e601; vol. 304, No. 2; (Abstract only).
Tada et al.; "Influence of Magnetic Anistropy on Hysteresis Loss of Non-oriented Electrical Steel Sheet;" The Iron and Steel Institute of Japan; 2015; pp. 269-273; vol. 101, No. 4.

* cited by examiner

NON-ORIENTED ELECTRICAL STEEL SHEET AND METHOD FOR MANUFACTURING THE SAME

TECHNICAL FIELD

The present invention relates to a non-oriented electrical steel sheet and a method for manufacturing the same, and particularly to a non-oriented electrical steel sheet having an improved cold rolling property and magnetic property and a method for manufacturing the non-oriented electrical steel sheet.

BACKGROUND ART

A non-oriented electrical steel sheet is a soft magnetic material primarily used as an iron core of a motor and is strongly required to have a low iron loss from the viewpoint of improvement in the motor efficiency. In particular, motors in expanding markets in recent years, such as a motor for driving an EV or an HEV and a motor for a high-efficiency air conditioner, need to have a good high-frequency iron loss property as an important factor because of the recent trend toward high-speed rotation for reduction of the motor size.

To reduce iron loss at high frequencies, it is effective to reduce classical eddy current loss based on formation of high alloy steel in which large amounts of elements that increase the specific resistance, such as Si, Al, and Mn, are added to the steel sheet and thickness reduction in which the thickness of the steel sheet is reduced. The formation of high alloy steel, however, causes a problem of a decrease in the toughness of the steel, resulting in likelihood of occurrence of operation troubles in cold rolling, such as sheet breakage.

To address the problem described above, Patent Literature 1 proposes a method for optimizing the balance among Si, sol. Al, and Mn to be added to a non-oriented electrical steel sheet, and also heating the steel sheet before cold rolling to a temperature ranging from 50 to 200° C., and performing cold rolling with the sheet passing speed in the first pass of the rolling limited to a value ranging from 60 to 200 m/min.

CITATION LIST

Patent Literature

Patent Literature 1: International Publication No. WO 2013/146879

SUMMARY OF INVENTION

Technical Problem

However, problems with the technology described in Patent Literature 1 have been pointed out, such as failure in the shape of the steel sheet due to temperature unevenness when heated before the cold rolling and a decrease in productivity in the cold rolling due to the time period required for the heating.

The present invention has been made in view of the above problems inherent to the related art, and an object thereof is to provide a non-oriented electrical steel sheet that allows the cold rolling property to improve with no degradation in the magnetic property and no decrease in the productivity, even in a case where the steel sheet contains large amounts of alloy elements of Si, Al, Mn, and the like, and to propose a method for manufacturing the non-oriented electrical steel sheet.

Solution to Problem

To achieve the object described above, the inventors intensively conducted examination, focusing on an effect of the chemical composition of a non-oriented electrical steel sheet containing large amounts of Si, Mn, Al, and the like upon the cold rolling property. As a result, the inventors have found out that it is effective to use high-purity steel having minimized contents of P and As in order to improve the cold rolling property of a high-alloy non-oriented electrical steel sheet.

Reduction in the P and As contents, however, causes oxidation and nitriding on the surface of the steel sheet in finish annealing after the cold rolling to be likely to occur, resulting in a new problem of an adverse effect on the magnetic property of a product sheet. It has been believed in related art that adding Sn and Sb is effective in preventing oxidation and nitriding on the surface of the steel sheet. The inventors have, however, found that only the addition of Sn and Sb cannot fully prevent oxidation and nitriding (nitriding in particular) on the surface of the steel sheet in finish annealing, and that full prevention of the nitriding requires elimination of $N_2$ from the finish annealing atmosphere.

The inventors have further found that reduction in P and As contents undesirably increases a surface defect (scabs) resulting from cracks in the surface of a slab or a steel sheet in continuous casting and hot rolling steps. To solve the problem, the inventors have found that it is effective to add trace amounts of Mo and W as components of the steel and perform rough rolling, which is part of the hot rolling, with a rolling reduction in the first pass of the rough rolling of not more than 25% and at an average strain rate of not more than 4/seconds, from which the present invention has been thus developed.

The present invention based on the findings described above relates to a non-oriented electrical steel sheet having a chemical composition containing C: not more than 0.0050 mass %, Si: 3.2 to 4.5 mass %, Mn: 0.1 to 2.0 mass %, P: not more than 0.020 mass %, S: not more than 0.0050 mass %, Al: 0.4 to 2.0 mass %, N: not more than 0.0050 mass %, Ti: not more than 0.0030 mass %, As: not more than 0.0030 mass %, Sn+Sb: 0.005 to 0.10 mass %, and O: not more than 0.0050 mass % and further containing one or two elements selected from Mo and W by a content ranging from 0.0020 to 0.10 mass % in total and a remainder being Fe and inevitable impurities.

The non-oriented electrical steel sheet according to the present invention is characterized by further containing one or two or more elements selected from Ca, Mg, and REM in a total amount ranging from 0.0005 to 0.020 mass % in addition to the chemical composition.

The non-oriented electrical steel sheet according to the present invention is also characterized in that a number density of Al-based precipitates having a size ranging from 50 to 500 nm and present in a region below a surface of a cross section of the steel sheet by a depth of not more than 2.0 μm is not more than $0.010/\mu m^2$.

The non-oriented electrical steel sheet according to the present invention is characterized in that a thickness of the steel sheet is not more than 0.30 mm.

The present invention further proposes a method for manufacturing a non-oriented electrical steel sheet comprising hot rolling a steel slab having the chemical composition described in any of the above, optionally conducting hot-band annealing, subjecting the resultant steel sheet to one cold rolling or two or more cold rollings including an intermediate annealing therebetween to achieve a final sheet thickness, and then subjecting the cold rolled sheet to finish annealing, characterized in that an atmosphere in the finish annealing is a mixed gas formed of one or two or more gases selected from $N_2$, $H_2$, and rare gases, and a $N_2$ content in the atmosphere is not more than 20 vol %.

The method for manufacturing the non-oriented electrical steel sheet according to the present invention is characterized in that rolling reduction in the first pass of rough rolling of the hot rolling is set to not more than 25%, and an average strain rate in the first pass is set to not more than 4/sec.

The method for manufacturing the non-oriented electrical steel sheet according to the present invention is characterized in that a thickness of the steel sheet after the cold rolling is not more than 0.30 mm.

Advantageous Effect of Invention

The present invention allows cold rolling property of a non-oriented electrical steel sheet containing large amounts of alloy elements to improve with no degradation in the magnetic property and no decrease in the productivity thereof. According to the present invention, therefore, a non-oriented electrical steel sheet having a low iron loss can be stably manufactured, which greatly contributes to improvement in the efficiency of a motor for driving an EV or an HEV and a motor for a high-efficiency air conditioner.

DESCRIPTION OF EMBODIMENT

Experiments that triggered the development of the present invention will first be described.

Experiment 1

Steel having a chemical composition containing C: 0.0020 mass %, Si: 3.65 mass %, Mn: 0.60 mass %, P: 0.005 mass %, S: 0.0020 mass %, Al: 0.60 mass %, O: 0.0025 mass %, N: 0.0015 mass %, Ti: 0.0010 mass %, Sn: 0.025 mass %, and Mo: 0.006 mass % and further containing As by a content that variously changes within the range from 0.0005 to 0.006 mass % and the remainder being Fe and inevitable impurities is melted in a vacuum melting furnace to produce a steel ingot, which is then heated at 1100° C. for 20 minutes and hot rolled to form a hot rolled sheet having a thickness of 2.2 mm.

The hot rolled sheet is subjected to hot-band annealing at 1000° C. for 30 seconds, followed by collection of a bending test specimen having a length of 100 mm and a width of 30 mm, repetitive 45-degree bending test with the test specimen interposed between rounded jigs having a radius of 15 mm, and measurement of the number of bending up to breakage of the test specimen.

Figure 1:
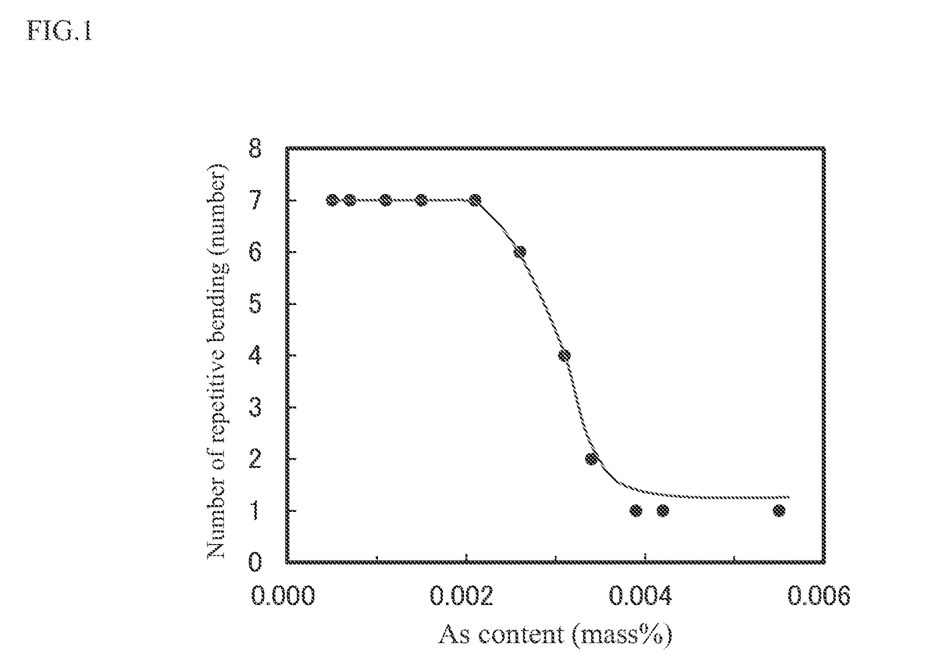
FIG. 1 is a graph showing an effect of the As content on the number of times of repetitive bending performed on a hot rolled sheet.

FIG. 1 shows the result of the bending test. As seen from FIG. 1, reducing the As content to not more than 0.0030 mass % leads to significant improvement in bending workability.

Experiment 2

Steel having a chemical composition containing C: 0.0020 mass %, Si: 3.65 mass %, Mn: 0.60 mass %, S: 0.0020 mass %, Al: 0.60 mass %, O: 0.0025 mass %, N: 0.0015 mass %, Ti: 0.0010 mass %, As: 0.0010 mass %, Sn: 0.025 mass %, and Mo: 0.006 mass % and further containing P by a content that variously changes within the range from 0.004 to 0.06 mass % and the remainder being Fe and inevitable impurities is melted in a vacuum melting furnace to form a steel ingot, which is then heated at 1100° C. for 20 minutes and hot rolled to form a hot rolled sheet having the thickness of 2.2 mm.

The hot rolled sheet is subjected to hot-band annealing at 1000° C. for 30 seconds, followed by collection of a bending test specimen having the length of 100 mm and the width of 30 mm, repetitive 45-degree bending test with the test specimen interposed between the rounded jigs having the radius of 15 mm, and measurement of the number of bending up to breakage of the test specimen.

Figure 2:
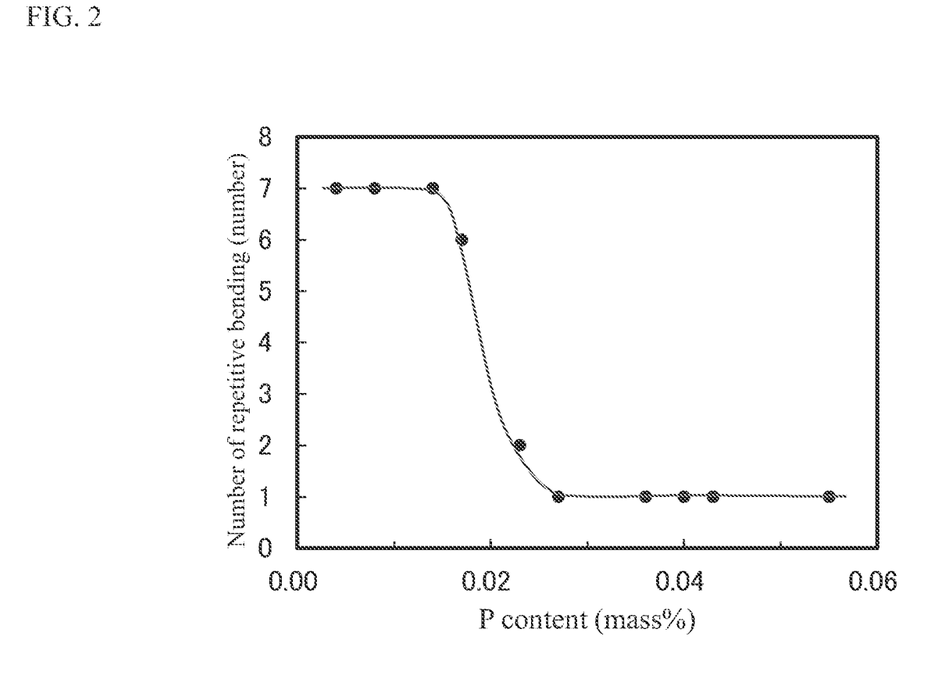
FIG. 2 is a graph showing an effect of the P content on the number of times of repetitive bending performed on a hot rolled sheet.

FIG. 2 shows the result of the bending test. As seen from FIG. 2, reducing the P content to not more than 0.020 mass % leads to significant improvement in bending workability.

Experiment 3

To ascertain the effects of As and P on the magnetic property based on the results of the experiments described above, the following experiment is conducted by melting steel having reduced As and P contents.

Steel having a chemical composition containing C: 0.0020 mass %, Si: 3.65 mass %, Mn: 0.60 mass %, P: 0.005 mass %, S: 0.0020 mass %, Al: 0.60 mass %, O: 0.0025 mass %, N: 0.0015 mass %, Ti: 0.0010 mass %, As: 0.0010 mass %, Sn: 0.025 mass %, Mo: 0.007 mass %, and the remainder being Fe and inevitable impurities is melted in a vacuum melting furnace to form a steel ingot, which is then heated at 1100° C. for 20 minutes and hot rolled to form a hot rolled sheet having the thickness of 2.2 mm.

The hot rolled sheet is then subjected to hot-band annealing at 1000° C. for 30 seconds, pickled, cold rolled into a cold rolled sheet having a final thickness of 0.25 mm. The cold rolled sheet is then subjected to finish annealing at 1000° C. for 10 seconds in an atmosphere containing $H_2$ and $N_2$ mixed at the ratio of 30:70 vol % and having a dew point of −50° C.

Iron loss $W_{10/400}$ of the steel sheet (iron loss value obtained when the steel sheet undergoes sinusoidal excitation with maximum magnetic flux density of 1.0 T and at a frequency of 400 Hz) after the finish annealing is then measured, but an iron loss as expected by the inventors is not obtained. To investigate the cause of the unexpected result, a cross section of the steel sheet after the finish annealing is observed with a SEM. In the observation, fine Al precipitates are recognized in a surface layer of the steel sheet, specifically, in a cross section below the surface of the steel sheet by not more than 2.0 μm in the sheet thickness direction, from which the increase in the iron loss is presumed to be caused. The reason for this is believed due to the fact that since the amounts of As and P, each of which is a grain boundary segregating element, are reduced in the present experiments, grain boundary diffusion is actively caused in the finish annealing to facilitate oxidation and nitriding (nitriding in particular) of Al in the surface layer of the steel sheet.

Related-art findings suggest that adding Sn and Sb suppresses oxidation and nitriding on the surface of the steel sheet, but the present experiments provides a different result, as described above. The reason for the different result is believed due to the fact that a high-purity steel material in which the As and P contents are each reduced to an ultratrace amount is used in the present experiments. In view of the result described above, to positively prevent oxidation and nitriding in the finish annealing to avoid the above-mentioned adverse effect on the iron loss, another experiment is conducted by changing the proportion of $N_2$ in the mixed atmosphere containing $H_2$ and $N_2$ used in the finish annealing in the experiments described above.

Figure 3:
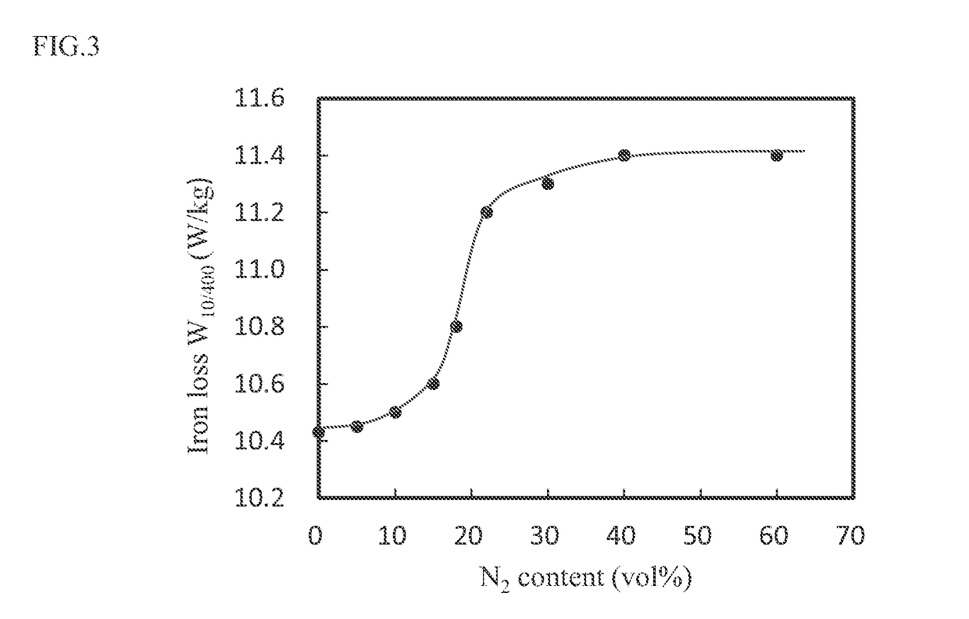
FIG. 3 is a graph showing an effect of the $N_2$ content in the atmosphere of finish annealing on iron loss $W_{10/400}$.
Figure 4:
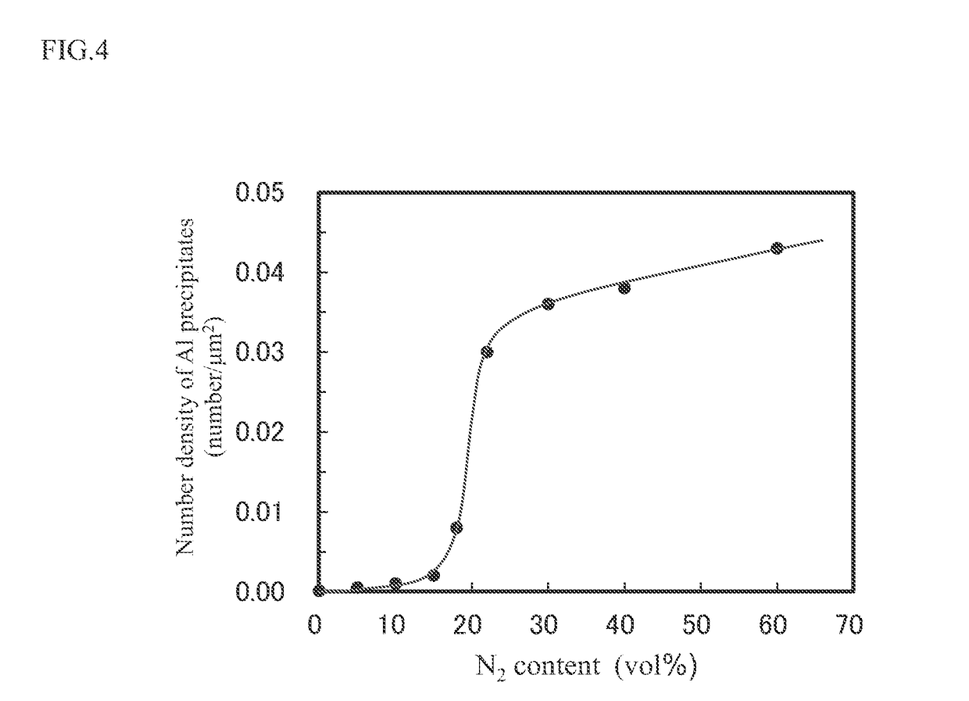
FIG. 4 is a graph showing an effect of the $N_2$ content in the atmosphere of finish annealing on the number density of Al-based precipitates in a surface layer of a steel sheet.

FIG. 3 shows the result of the experiment with a changed proportion. FIG. 3 reveals that reduction in the $N_2$ concentration in the atmosphere used in the finish annealing to not more than 20 vol % provides excellent iron loss property.

The present invention has been developed based on the novel findings described above.

The chemical composition of a non-oriented electrical steel sheet according to the present invention will next be described.

C: not more than 0.0050 mass %

Since C is a harmful element that causes magnetic aging to increase the iron loss of a product sheet, the upper limit of the C content is set to 0.0050 mass %. The C content is preferably not more than 0.0025 mass %.

Si: 3.2 to 4.5 mass %

Si is an element effective in increasing the specific resistance of steel to reduce high-frequency iron loss. To achieve the effect described above, it is necessary to add Si by not less than 3.2 mass %. An increase in Si, however, increases the strength but decreases the toughness of the steel, resulting in degradation in cold rolling property. The upper limit of the Si content is therefore set to 4.5 mass % in the present invention. The Si content preferably ranges from 3.4 to 4.3 mass %, more preferably from 3.6 to 4.1 mass %.

Mn: 0.1 to 2.0 mass %

Mn is an element effective in increasing the specific resistance of steel to reduce high-frequency iron loss, as are Si and Al, but the iron loss reduction effect of Mn is small as compared to Si and Al. Further, fixing S in the form of MnS provides another advantageous effect of suppressing hot brittleness. To achieve the effect described above, it is necessary to add Mn by not less than 0.1 mass %. A large addition amount of Mn, however, increases the raw material cost, and the upper limit of the Mn content is therefore set to 2.0 mass %. The Mn content preferably ranges from 0.3 to 1.0 mass %.

P: not more than 0.020 mass %

P, which causes embrittlement of steel and therefore increases chances of cracking in the cold rolling (sheet breakage), is desirably minimized. The upper limit of the P content is therefore limited to 0.020 mass % in the present invention. The P content is preferably not more than 0.010 mass %.

S: not more than 0.0050 mass %

S, which is a harmful element that forms fine sulfides to hinder crystal grain growth and therefore increases iron loss, is desirably minimized. The upper limit of the S content is therefore set to 0.0050 mass % in the present invention. The S content is preferably not more than 0.0030 mass %.

Al: 0.4 to 2.0 mass %

Al is an element effective in increasing the specific resistance of steel to reduce high-frequency iron loss. To achieve the effect described above, it is necessary to add Al by not less than 0.4 mass %. An increase in the addition amount of Al, however, not only increases the raw material cost but causes the surface of the steel sheet to be likely to undergo oxidation and nitriding, resulting in formation of fine precipitates, such as $Al_2O_3$ and AlN, in the surface layer of the steel sheet and cancellation of the effect for improving iron loss property. The upper limit of the Al content is therefore set to 2.0 mass %. The Al content preferably falls within the ranges of 0.6 to 1.20 mass %.

N: not more than 0.0050 mass %

N, which is a harmful element that forms fine nitrides to hinder crystal grain growth and therefore increases iron loss, is desirably minimized. The upper limit of the N content is therefore limited to 0.0050 mass % in the present invention. The N content is preferably not more than 0.0030 mass %.

Ti: not more than 0.0030 mass %

Ti, which is a harmful element that forms fine TiN and the like to hinder crystal grain growth and therefore increases iron loss, is desirably minimized. The upper limit of the Ti content is therefore limited to 0.0030 mass % in the present invention. The Ti content is preferably not more than 0.0015 mass %.

As: not more than 0.0030 mass %

As, which is a harmful element that causes embrittlement of steel to cause edge cracking and sheet breakage in the cold rolling, is desirably minimized. The upper limit of the As content is therefore limited to 0.0030 mass % in the present invention. The As content is preferably not more than 0.0020 mass %.

Sb+Sn: 0.005 to 0.10 mass %

Sb and Sn are elements that segregate onto the surface of the steel sheet to suppress oxidation and nitriding and therefore provide an effect for improving the iron loss property. To achieve the effect described above, it is necessary to add Sb+Sn by not less than 0.005 mass % in total. Adding Sb+Sn by an amount more than 0.10 mass % only results in saturation of the effect described above, and the upper limit of the Sb+Sn content is therefore set at 0.10 mass % in total. The Sb+Sn content preferably ranges from 0.01 to 0.05 mass %. Sb+Sn, however, provides a harmful effect of facilitating occurrence of scabs, and it is therefore effective to add Sb+Sn simultaneously with Mo and W, which will be described later.

Mo, W: 0.0020 to 0.10 mass % in total

Mo and W are elements effective in suppressing the surface defect (scabs) of a high-alloy steel sheet containing large amounts of alloy elements of Si, Al, Mn, and the like. A high-alloy steel sheet is likely to have an oxidized surface and is therefore believed to have high occurrence of scabs resulting from surface cracking. However, adding Mo and W, each of which is an element that increases high-temperature strength, by trace amounts allows suppression of cracking. When the total addition amount of Mo and W is less than 0.0020 mass %, the effect described above is not achieved, whereas adding Mo and W by an amount more than 0.10 mass % in total only results in saturation of the effect and an increase in the raw material cost. The Mo and W content is therefore limited to the range described above. The Mo and W content preferably ranges from 0.0050 to 0.050 mass %.

O: not more than 0.0050 mass %

O, which is a harmful element that forms oxide inclusions in steel to increase iron loss, is desirably minimized. The upper limit of the 0 content is therefore set to 0.0050 mass % in the present invention. The 0 content is preferably not more than 0.0030 mass %.

The non-oriented electrical steel sheet according to the present invention can contain one or two or more elements selected from Ca, Mg, and REM by a content ranging from 0.0005 to 0.020 mass % in total in addition to the essential components described above.

Ca, Mg, and REM, each of which forms a very stable, large sulfide to reduce the amount of fine precipitates, provide the effect of facilitating grain growth to reduce iron loss. To achieve the effect described above, it is necessary to add Ca, Mg, and REM by at least 0.0005 mass %, whereas adding Ca, Mg, and REM by an amount more than 0.020 mass % results in saturation of the effect described above. The content of Ca, Mg, and REM, when added, therefore preferably ranges from 0.0005 to 0.020 mass % in total.

A method for manufacturing the non-oriented electrical steel sheet according to the present invention will next be described.

A steel material (slab) used to manufacture the non-oriented electrical steel sheet according to the present invention can be manufactured by melting steel that satisfies the chemical composition described above in a typically known refining process using a converter, an electric furnace, or a vacuum degassing apparatus and then performing a continuous casting method or an ingot-making-blooming method.

The slab described above is reheated and hot rolled into a hot rolled sheet having a predetermined thickness. The reheating temperature of the slab preferably ranges from 1000 to 1200° C. The reason for this is that Ostwald ripening of MnS and AlN is insufficient when the reheating temperature is lower than 1000° C., whereas, when the reheating temperature is higher than 1200° C., MnS and AlN dissolve in the form of a solid solution and a part thereof precipitates in the form of fine precipitates in the following step, resulting in adverse effect on iron loss.

The hot rolling described above is typically comprised of rough rolling and finish rolling, and it is important to perform the rolling with the rolling reduction in the first pass of the hot rolling, that is, in the first pass of the rough rolling set to not more than 25% and the average strain rate set to not more than 4/sec. The reason for this is that since in the case of high-alloy steel containing large amounts of alloy components, such as a non-oriented electrical steel sheet, the surface layer of a material under rolling is likely to be oxidized, and deviation from the conditions described above causes grain boundary cracking in the surface of the material under rolling, resulting in an increase in occurrence of scabs. It is more preferable that the rolling reduction in the first pass of the rough rolling is not more than 20% and the average strain rate is not more than 2/sec. The strain rate described above is a value calculated based on the expression described in a technical literature written by Shigeru Shida (Journal of the Japan Society for Technology of Plasticity, 7 (1966), p. 424)).

It is further preferable that the end temperature of the finish rolling in the hot rolling is not lower than 700° C. and the winding temperature is not higher than 700° C. The reason for this is that it is difficult to roll the sheet to a predetermined thickness when the finish rolling end temperature is lower than 700° C., whereas descaling property deteriorates when the winding temperature is higher than 700° C.

The steel sheet after the hot rolling (hot rolled sheet) is subjected to hot-band annealing as required. The reason for this is that hot-band annealing is effective in improving the magnetic property and preventing ridging.

The hot rolled sheet after hot rolling or the hot rolled sheet subjected to hot-band annealing after hot rolling is then pickled and subjected to one cold rolling or two or more cold rollings including an intermediate annealing therebetween into a cold rolled sheet having a final thickness. The final thickness described above (product thickness) is preferably not more than 0.30 mm, more preferably not more than 0.20 mm. The reason for this is that the non-oriented electrical steel sheet according to the present invention is characterized in that oxidation and nitriding on the surface of the steel sheet is suppressed and the thinner the steel sheet, the more remarkable the effect of the present invention (effect for improving iron loss property). Excessive reduction in the thickness of the steel sheet lowers the productivity so that the manufacturing cost increases and makes it difficult to manufacture a core, and the lower limit of the thickness of the steel sheet is therefore preferably set to about 0.10 mm.

The cold rolled sheet having the final thickness is then subjected to finish annealing and coated with an insulating coating as required to form a product sheet. The finish annealing can be performed by using a known method, but preferably performed in a continuous-annealing line at a soaking temperature ranging from 700 to 1100° C. for a soaking time of not more than 300 seconds. The soaking temperature and time can be adjusted as appropriate in accordance with a target magnetic property, a target mechanical property, and other factors.

In the method for manufacturing the non-oriented electrical steel sheet according to the present invention, it is important to control the atmosphere of the finish annealing because a steel sheet containing large amounts of Si, Al, Mn, and the like is likely to cause surface oxidation and nitriding. Specifically, it is necessary that an atmosphere gas in the finish annealing is a mixed gas formed of one or two or more gases selected from $N_2$, $H_2$, and rare gases from the viewpoint of prevention of oxidation and nitriding of the surface of the steel sheet and the $N_2$ content in the atmosphere gas is not more than 20 vol %. The $N_2$ content is preferably not more than 10 vol %, and the annealing is preferably performed, for example, in an atmosphere containing $H_2$ and $N_2$ mixed at the ratio of 90:10 vol %. Further, the dew point is preferably at a lowest possible value, specifically, not higher than −30° C.

A method for evaluating the degrees of oxidation and nitriding on the surface of the steel sheet may include cutting the final product sheet along the rolling direction, burying the cut sheet in a molding resin, polishing the resultant structure, etching the polished structure in a 1-mass % nital liquid for one second to visualize the steel sheet tissue and precipitates, and then measuring the number density of Al precipitates having precipitated in a surface layer of the steel sheet (region below the surface of the steel sheet by not more than 2.0 µm) with a SEM. Whether or not it is an Al precipitate can be easily determined from an EDX spectrum. The size of the Al precipitates (circle-equivalent diameter thereof) under observation is limited to values ranging from 50 to 500 nm. The reason why precipitates of less than 50 nm are excluded is that it is difficult to perform composition analysis with SEM-based EDX. The reason why precipitates of more than 500 nm are excluded is that coarse precipitates are not formed by nitriding or oxidation in the finish annealing but are already contained before the finish annealing. When the number of Al precipitates is not more than $0.010/\mu m^2$, it can be determined that the degrees of nitriding and oxidation on the surface of the steel sheet in the finish annealing are low. The number density of the Al precipitates is more preferably not more than $0.001/\mu m^2$.

Example 1

A steel slab having a thickness of 200 mm produced by melting steel having a variety of chemical compositions shown in Table 1 and subjecting the melted steel to continuous casting is reheated at 1100° C. for 30 minutes and then subjected to hot rolling comprised of rough rolling with the rolling reduction in the first pass of the rough hot rolling of 15% and at the strain rate of 1/second and finish rolling to produce a hot rolled sheet having a thickness of 2.0 mm. The end temperature of the finish rolling is set to 910° C., and the winding temperature is set to 600° C. The hot rolled sheet is then subjected to hot-band annealing at 980° C. for 20 seconds, followed by pickling, cold rolling into a cold rolled sheet having the final thickness of 0.25 mm. The cold rolled sheet is then subjected to finish annealing at 1000° C. for 10 seconds in an atmosphere containing $H_2$ and Ar mixed at the ratio of 20:80 vol % and having the dew point of −50° C. and coated with an insulation coating to form a product sheet.

The product sheet then undergoes measurement of the occurrence of scabs having occurred on the surface of the steel sheet (percentage of length removed as defective portion), and also, a test specimen is taken out from the product sheet to measure an iron loss $W_{10/400}$ of the steel sheet (iron loss obtained when the steel sheet undergoes sinusoidal excitation with maximum magnetic flux density of 1.0 T and at a frequency of 400 Hz) and the number density of Al precipitates in a surface layer of the steel sheet (region below surface of steel sheet by 2.0 µm).

Tables 1-1 and 1-2 show the results of the measurement. As seen from the results, the steel sheet having the chemical composition according to the present invention has a low scab occurrence and a small number density of Al precipitates of not more than $0.010/\mu m^2$, which is excellent iron loss property.

TABLE 1-1

| Steel sheet No. | Chemical composition (mass %) | | | | | | | | | | | |
|---|---|---|---|---|---|---|---|---|---|---|---|---|
| | C | Si | Mn | P | S | Al | O | N | Ti | As | Sn | Sb |
| 1 | 0.0014 | 3.12 | 0.39 | 0.009 | 0.0012 | 0.71 | 0.0011 | 0.0018 | 0.0007 | 0.0014 | 0.026 | <0.001 |
| 2 | 0.0015 | 3.09 | 0.32 | 0.005 | 0.0011 | 0.68 | 0.0015 | 0.0014 | 0.0004 | 0.0008 | 0.022 | <0.001 |
| 3 | 0.0016 | 3.28 | 0.63 | 0.008 | 0.0018 | 0.83 | 0.0019 | 0.0018 | 0.0005 | 0.0012 | 0.016 | <0.001 |
| 4 | 0.0012 | 3.63 | 0.42 | 0.011 | 0.0012 | 0.72 | 0.0014 | 0.0013 | 0.0004 | 0.0009 | 0.031 | <0.001 |
| 5 | 0.0016 | 3.68 | 0.58 | 0.007 | 0.0016 | 0.74 | 0.0015 | 0.0012 | 0.0008 | 0.0005 | 0.028 | <0.001 |
| 6 | 0.0023 | 3.64 | 0.60 | 0.012 | 0.0011 | 0.72 | 0.0013 | 0.0013 | 0.0005 | 0.0008 | 0.022 | <0.001 |
| 7 | 0.0013 | 3.67 | 0.59 | 0.005 | 0.0011 | 0.68 | 0.0023 | 0.0020 | 0.0009 | 0.0007 | 0.026 | <0.001 |
| 8 | 0.0021 | 3.63 | 0.57 | 0.006 | 0.0013 | 0.70 | 0.0013 | 0.0012 | 0.0002 | 0.0008 | 0.028 | <0.001 |
| 9 | 0.0011 | 3.61 | 0.59 | 0.010 | 0.0017 | 0.74 | 0.0017 | 0.0011 | 0.0003 | 0.0014 | 0.027 | <0.001 |
| 10 | 0.0013 | 3.64 | 0.63 | 0.007 | 0.0022 | 0.72 | 0.0018 | 0.0022 | 0.0011 | 0.0011 | 0.026 | <0.001 |
| 11 | 0.0014 | 3.65 | 0.63 | 0.010 | 0.0012 | 0.73 | 0.0015 | 0.0021 | 0.0011 | 0.0012 | 0.028 | <0.001 |
| 12 | 0.0022 | 3.69 | 0.65 | 0.005 | 0.0011 | 0.71 | 0.0014 | 0.0010 | 0.0002 | 0.0009 | 0.015 | <0.001 |
| 13 | 0.0014 | 3.61 | 0.61 | 0.008 | 0.0024 | 0.74 | 0.0010 | 0.0011 | 0.0013 | 0.0010 | 0.018 | <0.001 |
| 14 | 0.0020 | 3.62 | 0.62 | 0.005 | 0.0010 | 0.65 | 0.0013 | 0.0010 | 0.0012 | 0.0013 | 0.024 | <0.001 |
| 15 | 0.0018 | 3.66 | 0.56 | 0.012 | 0.0015 | 0.65 | 0.0018 | 0.0011 | 0.0016 | 0.0012 | 0.001 | 0.002 |
| 16 | 0.0013 | 3.62 | 0.59 | 0.013 | 0.0011 | 0.68 | 0.0015 | 0.0018 | 0.0015 | 0.0008 | 0.007 | <0.001 |
| 17 | 0.0022 | 3.60 | 0.56 | 0.012 | 0.0012 | 0.72 | 0.0015 | 0.0018 | 0.0002 | 0.0013 | 0.042 | <0.001 |
| 18 | 0.0023 | 3.61 | 0.64 | 0.012 | 0.0009 | 0.74 | 0.0018 | 0.0011 | 0.0008 | 0.0007 | 0.089 | <0.001 |
| 19 | 0.0021 | 3.63 | 0.58 | 0.007 | 0.0012 | 0.66 | 0.0024 | 0.0023 | 0.0010 | 0.0012 | <0.001 | 0.008 |
| 20 | 0.0012 | 3.64 | 0.65 | 0.014 | 0.0021 | 0.70 | 0.0013 | 0.0012 | 0.0005 | 0.0005 | <0.001 | 0.031 |
| 21 | 0.0011 | 3.59 | 0.55 | 0.008 | 0.0016 | 0.71 | 0.0012 | 0.0016 | 0.0003 | 0.0012 | <0.001 | 0.084 |

| Steel sheet No. | Chemical composition (mass %) | | | Product property | | | |
|---|---|---|---|---|---|---|---|
| | Mo | W | Others | Scab occurrence (%) | Number density of Al precipitates (number/$\mu m^2$) | Iron loss $W_{10/400}$ (W/kg) | Remarks |
| 1 | <0.0005 | <0.0005 | — | 0.0 | <0.001 | 11.7 | Comparative Example |
| 2 | <0.0005 | 0.0062 | — | 0.0 | <0.001 | 11.6 | Comparative Example |
| 3 | <0.0005 | 0.0042 | — | 0.1 | <0.001 | 10.9 | Invention Example |
| 4 | <0.0005 | <0.0005 | — | 3.6 | 0.001 | 10.4 | Comparative Example |
| 5 | 0.0018 | <0.0005 | — | 3.5 | 0.001 | 10.5 | Comparative Example |
| 6 | 0.0028 | <0.0005 | — | 0.9 | 0.002 | 10.4 | Invention Example |
| 7 | 0.0045 | <0.0005 | — | 0.1 | 0.001 | 10.4 | Invention Example |
| 8 | 0.026 | <0.0005 | — | 0.0 | 0.001 | 10.5 | Invention Example |
| 9 | 0.074 | <0.0005 | — | 0.0 | 0.002 | 10.5 | Invention Example |
| 10 | <0.0005 | 0.0014 | — | 3.5 | 0.001 | 10.4 | Comparative Example |
| 11 | <0.0005 | 0.0026 | — | 0.8 | 0.001 | 10.5 | Invention Example |
| 12 | <0.0005 | 0.0054 | — | 0.1 | 0.002 | 10.4 | Invention Example |
| 13 | <0.0005 | 0.034 | — | 0.0 | 0.002 | 10.5 | Invention Example |
| 14 | <0.0005 | 0.082 | — | 0.0 | 0.001 | 10.5 | Invention Example |
| 15 | <0.0005 | <0.0005 | — | 0.0 | 0.045 | 11.1 | Comparative Example |
| 16 | <0.0005 | 0.0084 | — | 0.0 | 0.008 | 10.7 | Invention Example |
| 17 | <0.0005 | 0.0093 | — | 0.1 | 0.002 | 10.4 | Invention Example |
| 18 | <0.0005 | 0.0064 | — | 0.2 | 0.001 | 10.3 | Invention Example |
| 19 | <0.0005 | 0.0082 | — | 0.1 | 0.007 | 10.7 | Invention Example |
| 20 | 0.0036 | 0.0068 | — | 0.1 | 0.001 | 10.4 | Invention Example |
| 21 | 0.0067 | 0.0162 | — | 0.2 | 0.001 | 10.3 | Invention Example |

TABLE 1-2

| Steel sheet No. | Chemical composition (mass %) | | | | | | | | | | | |
|---|---|---|---|---|---|---|---|---|---|---|---|---|
| | C | Si | Mn | P | S | Al | O | N | Ti | As | Sn | Sb |
| 22 | 0.0011 | 4.23 | 0.52 | 0.006 | 0.0011 | 0.79 | 0.0011 | 0.0009 | 0.0006 | 0.0014 | 0.024 | <0.001 |
| 23 | 0.0013 | 4.61 | 0.43 | 0.005 | 0.0009 | 0.71 | 0.0016 | 0.0011 | 0.0011 | 0.0008 | 0.018 | <0.001 |
| 24 | 0.0012 | 3.86 | 0.91 | 0.005 | 0.0020 | 0.73 | 0.0019 | 0.0023 | 0.0007 | 0.0012 | 0.017 | 0.008 |
| 25 | 0.0014 | 3.65 | 1.83 | 0.006 | 0.0023 | 0.69 | 0.0014 | 0.0017 | 0.0008 | 0.0009 | 0.028 | <0.001 |
| 26 | 0.0023 | 3.59 | 0.64 | 0.031 | 0.0012 | 0.69 | 0.0011 | 0.0014 | 0.0014 | 0.0009 | 0.016 | <0.001 |
| 27 | 0.0019 | 3.65 | 0.60 | 0.007 | 0.0034 | 0.66 | 0.0010 | 0.0023 | 0.0014 | 0.0011 | 0.025 | <0.001 |
| 28 | 0.0018 | 3.64 | 0.64 | 0.011 | 0.0058 | 0.75 | 0.0018 | 0.0013 | 0.0011 | 0.0009 | 0.021 | <0.001 |
| 29 | 0.0020 | 3.62 | 0.61 | 0.008 | 0.0018 | 0.46 | 0.0013 | 0.0013 | 0.0011 | 0.0007 | 0.015 | <0.001 |
| 30 | 0.0012 | 3.89 | 0.64 | 0.009 | 0.0013 | 1.14 | 0.0018 | 0.0013 | 0.0009 | 0.0007 | 0.021 | 0.011 |

TABLE 1-2-continued

| | | | | | | | | | | | | |
|---|---|---|---|---|---|---|---|---|---|---|---|---|
| 31 | 0.0011 | 3.62 | 0.58 | 0.013 | 0.0019 | 1.64 | 0.0024 | 0.0017 | 0.0011 | 0.0008 | 0.016 | <0.001 |
| 32 | 0.0009 | 3.60 | 0.55 | 0.014 | 0.0012 | 0.73 | 0.0036 | 0.0023 | 0.0010 | 0.0013 | 0.026 | <0.001 |
| 33 | 0.0023 | 3.60 | 0.59 | 0.006 | 0.0015 | 0.75 | 0.0059 | 0.0010 | 0.0013 | 0.0014 | 0.017 | <0.001 |
| 34 | 0.0025 | 3.62 | 0.57 | 0.013 | 0.0008 | 0.65 | 0.0018 | 0.0035 | 0.0013 | 0.0005 | 0.023 | <0.001 |
| 35 | 0.0017 | 3.62 | 0.60 | 0.005 | 0.0015 | 0.71 | 0.0013 | 0.0058 | 0.0012 | 0.0006 | 0.021 | <0.001 |
| 36 | 0.0012 | 3.63 | 0.57 | 0.008 | 0.0017 | 0.73 | 0.0017 | 0.0023 | 0.0027 | 0.0007 | 0.027 | <0.001 |
| 37 | 0.0017 | 3.58 | 0.61 | 0.010 | 0.0011 | 0.73 | 0.0018 | 0.0011 | 0.0039 | 0.0011 | 0.021 | <0.001 |
| 38 | 0.0012 | 3.59 | 0.62 | 0.012 | 0.0012 | 0.65 | 0.0010 | 0.0014 | 0.0005 | 0.0027 | 0.026 | <0.001 |
| 39 | 0.0019 | 3.64 | 0.55 | 0.013 | 0.0018 | 0.72 | 0.0019 | 0.0010 | 0.0014 | 0.0039 | 0.028 | <0.001 |
| 40 | 0.0014 | 3.59 | 0.59 | 0.011 | 0.0014 | 0.73 | 0.0021 | 0.0012 | 0.0006 | 0.0013 | 0.018 | <0.001 |
| 41 | 0.0013 | 3.56 | 0.63 | 0.007 | 0.0010 | 0.70 | 0.0019 | 0.0015 | 0.0015 | 0.0012 | 0.021 | <0.001 |
| 42 | 0.0017 | 3.56 | 0.65 | 0.014 | 0.0008 | 0.73 | 0.0013 | 0.0020 | 0.0006 | 0.0010 | 0.015 | <0.001 |

| Steel sheet No. | Chemical composition (mass %) | | | Scab occurrence (%) | Number density of Al precipitates (number/$\mu m^2$) | Iron loss $W_{10/400}$ (W/kg) | Remarks |
|---|---|---|---|---|---|---|---|
| | Mo | W | Others | | | | |
| 22 | 0.0026 | 0.0121 | — | 0.0 | 0.004 | 10.1 | Invention Example |
| 23 | 0.0052 | <0.0005 | — | Unevaluable due to sheet breakage | | | Comparative Example |
| 24 | <0.0005 | 0.0063 | — | 0.1 | 0.002 | 10.2 | Invention Example |
| 25 | <0.0005 | 0.0046 | — | 0.2 | 0.002 | 9.9 | Invention Example |
| 26 | 0.0041 | <0.0005 | — | Unevaluable due to sheet breakage | | | Comparative Example |
| 27 | 0.0042 | 0.0063 | — | 0.1 | 0.001 | 10.6 | Invention Example |
| 28 | <0.0005 | 0.0083 | — | 0.2 | 0.002 | 11.2 | Comparative Example |
| 29 | <0.0005 | 0.0064 | — | 0.0 | 0.001 | 10.6 | Invention Example |
| 30 | <0.0005 | 0.0065 | — | 0.1 | 0.002 | 10.0 | Invention Example |
| 31 | 0.0046 | 0.0055 | — | 0.2 | 0.004 | 9.6 | Invention Example |
| 32 | 0.0036 | 0.0048 | — | 0.0 | 0.001 | 10.7 | Invention Example |
| 33 | 0.0033 | 0.0042 | — | 0.1 | 0.002 | 11.3 | Comparative Example |
| 34 | 0.0045 | <0.0005 | — | 0.0 | 0.002 | 10.6 | Invention Example |
| 35 | 0.0063 | <0.0005 | — | 0.1 | 0.002 | 11.2 | Comparative Example |
| 36 | <0.0005 | 0.0078 | — | 0.1 | 0.002 | 10.7 | Invention Example |
| 37 | <0.0005 | 0.0092 | — | 0.1 | 0.001 | 11.2 | Comparative Example |
| 38 | <0.0005 | 0.0068 | — | 0.1 | 0.001 | 10.5 | Invention Example |
| 39 | <0.0005 | 0.0056 | | Unevaluable due to sheet breakage | | | Comparative Example |
| 40 | <0.0005 | 0.0072 | Ca: 0.0034 | 0.1 | 0.002 | 10.2 | Invention Example |
| 41 | <0.0005 | 0.0079 | REM: 0.0053 | 0.1 | 0.002 | 10.3 | Invention Example |
| 42 | <0.0005 | 0.0071 | Mg: 0.0021 | 0.1 | 0.001 | 10.2 | Invention Example |

Example 2

The steel slab shown as No. 12 in Table 1 is reheated at 1120° C. for 20 minutes, subjected to hot rolling comprised of rough rolling with the rolling reduction in the first pass of the rough hot rolling set to 18% and at the strain rate set to 2/second and finish rolling to produce a hot rolled sheet having a thickness of 1.6 mm. The end temperature of the finish rolling is set to 870° C., and the winding temperature is set to 500° C. The hot rolled sheet is then subjected to hot-band annealing at 990° C. for 30 seconds, followed by pickling, cold rolling into a cold rolled sheet having a final thickness of 0.20 mm. The cold rolled sheet is then subjected to finish annealing at 1030° C. for 15 seconds in a variety of atmospheres (dew point: −45° C.) shown in Table 2, and coated with an insulating coating to produce a product sheet.

The product sheet undergoes measurement of the occurrence of scabs having occurred on the surface of the steel sheet (percentage of length removed as defective portion), and a test specimen is taken out from the product sheet to measure iron loss $W_{10/400}$ of the steel sheet (iron loss obtained when the steel sheet undergoes sinusoidal excitation with maximum magnetic flux density of 1.0 T and at a frequency of 400 Hz) and the number density of Al precipitates in a surface layer of the steel sheet (region below surface of steel sheet by 2.0 μm).

Table 2 shows the results of the measurement. As seen first from the results, the steel sheets Nos. 1 to 5, each of which has the chemical composition according to the present invention, have a low scab occurrence. Further, the steel sheets Nos. 2 to 5, which have undergone the finish annealing in a preferable atmosphere in the present invention so that oxidation and nitriding have been suppressed, have a number density of Al precipitates of not more than 0.010/μm², which means more excellent iron loss property.

TABLE 2

| No | Atmosphere (vol % ratio) | Scab occurrence (%) | Number density of Al precipitates (number/$\mu m^2$) | Iron loss $W_{10/400}$ (W/kg) | Remarks |
|---|---|---|---|---|---|
| 1 | $H_2:N_2 = 30:70$ | 0.0 | 0.045 | 10.4 | Invention Example |
| 2 | $H_2 = 100$ | 0.0 | 0.001 | 9.3 | Invention Example |
| 3 | Ar = 100 | 0.0 | 0.002 | 9.4 | Invention Example |

TABLE 2-continued

| No | Atmosphere (vol % ratio) | Scab occurrence (%) | Number density of Al precipitates (number/μm$^2$) | Iron loss $W_{10/400}$ (W/kg) | Remarks |
|---|---|---|---|---|---|
| 4 | He = 100 | 0.0 | 0.002 | 9.4 | Invention Example |
| 5 | Ar:N$_2$ = 90:10 | 0.0 | 0.003 | 9.5 | Invention Example |

Example 3

The steel slab shown as No. 7 in Table 1 is reheated at 1090° C. for 30 minutes and subjected to hot rolling comprised of rough rolling with the rolling reduction in the first pass of the rough hot rolling and at the strain rate variously changed as shown in Table 3 and finish rolling to form a hot rolled sheet having a thickness of 1.8 mm. The end temperature of the finish rolling is set to 820° C., and the winding temperature is set at 550° C. The hot rolled sheet is then subjected to hot-band annealing at 910° C. for 30 seconds, followed by pickling, cold rolling into a cold rolled sheet having the final thickness of 0.25 mm. The cold rolled sheet is then subjected to finish annealing at 1000° C. for 10 seconds in an atmosphere containing 100-vol % H$_2$ (dew point: −55° C.), and coated with an insulating coating to produce a product sheet.

The product sheet undergoes measurement of the occurrence of scabs having occurred on the surface of the steel sheet (percentage of length removed as defective portion), and a test specimen is taken out from the product sheet to measure iron loss $W_{10/400}$ of the steel sheet (iron loss obtained when the steel sheet undergoes sinusoidal excitation with maximum magnetic flux density of 1.0 T and at a frequency of 400 Hz) and the number density of Al precipitates in a surface layer of the steel sheet (region below surface of steel sheet by 2.0 μm).

Table 3 shows the results of the measurement along with the results. As seem from the results, the steel sheets Nos. 1 to 3 and Nos. 7 to 10, each of which has undergone the hot rough rolling with the rolling reduction and the strain rate in the first pass set at small values, have a greatly reduced scab occurrence as compared with the steel sheets Nos. 4 to 6 and Nos. 11 and 12, each of which has undergone the hot rough rolling with the rolling reduction and the strain rate in the first pass set at large values.

TABLE 3

| | First pass of rough hot rolling | | Scab occurrence (%) | Number density of Al precipitates (number/μm$^2$) | Iron loss $W_{10/400}$ (W/kg) | Remarks |
|---|---|---|---|---|---|---|
| No | Rolling reduction(%) | Strain rate (1/sec) | | | | |
| 1 | 12 | 1.0 | 0.0 | <0.001 | 10.4 | Invention Example |
| 2 | 16 | 1.0 | 0.1 | <0.001 | 10.3 | Invention Example |
| 3 | 23 | 1.0 | 0.3 | <0.001 | 10.4 | Invention Example |
| 4 | 27 | 1.0 | 1.2 | <0.001 | 10.4 | Invention Example |
| 5 | 32 | 1.0 | 1.4 | <0.001 | 10.3 | Invention Example |
| 6 | 36 | 1.0 | 1.5 | <0.001 | 10.4 | Invention Example |
| 7 | 18 | 1.0 | 0.1 | <0.001 | 10.4 | Invention Example |
| 8 | 18 | 1.6 | 0.1 | <0.001 | 10.3 | Invention Example |
| 9 | 18 | 2.5 | 0.2 | <0.001 | 10.4 | Invention Example |
| 10 | 18 | 3.8 | 0.3 | <0.001 | 10.3 | Invention Example |
| 11 | 18 | 4.3 | 1.4 | <0.001 | 10.4 | Invention Example |
| 12 | 18 | 5.6 | 1.5 | <0.001 | 10.4 | Invention Example |

The invention claimed is:

1. A non-oriented electrical steel sheet having a chemical composition comprising C: not more than 0.0050 mass %, Si: 3.2 to 4.5 mass %, Mn: 0.1 to 2.0 mass %, P: not more than 0.020 mass %, S: not more than 0.0050 mass %, Al: 0.4 to 2.0 mass %, N: not more than 0.0050 mass %, Ti: not more than 0.0030 mass %, As: more than 0 mass % and not more than 0.0030 mass %, Sn+Sb: 0.005 to 0.10 mass %, and O: more than 0 mass % and not more than 0.0050 mass %, and further containing one or two elements selected from Mo and W by a content ranging from 0.0020 to 0.10 mass % in total, and a remainder being Fe and inevitable impurities, wherein a number density of Al precipitates having a size ranging from 50 to 500 nm and present in a region below a surface of a cross section of the steel sheet by a depth of not more than 2.0 m is not more than 0.010/μm$^2$.

2. The non-oriented electrical steel sheet according to claim 1, which further contains one or two or more elements selected from Ca, Mg, and REM by a content ranging from 0.0005 to 0.020 mass % in total in addition to the chemical composition.

3. The non-oriented electrical steel sheet according to claim 1, wherein a thickness of the steel sheet is not more than 0.30 mm.

4. The non-oriented electrical steel sheet according to claim 2, wherein a thickness of the steel sheet is not more than 0.30 mm.

5. A method for manufacturing the non-oriented electrical steel sheet of claim 1, the method comprising:

hot rolling a steel slab having the chemical composition according to claim 1 to achieve a hot rolled steel sheet, optionally conducting hot-band annealing, subjecting the steel sheet to one cold rolling or two or more cold rollings including an intermediate annealing therebetween to achieve a cold rolled steel sheet with a final sheet thickness, and then subjecting the cold rolled steel sheet to finish annealing, wherein an atmosphere in the finish annealing is a mixed gas formed of one or two or more gases selected from the group consisting of N$_2$, H$_2$, and rare gases, and a N$_2$ content in the atmosphere in the finish annealing is not more than 20 vol %.

6. The method for manufacturing a non-oriented electrical steel sheet according to claim 5, wherein rolling reduction in a first pass of rough rolling of the hot rolling is set to not more than 25%, and an average strain rate in the first pass is set to not more than 4/sec.

7. The method for manufacturing a non-oriented electrical steel sheet according to claim 5, wherein a thickness of the steel sheet after the cold rolling is not more than 0.30 mm.

8. The method for manufacturing a non-oriented electrical steel sheet according to claim 6, wherein a thickness of the steel sheet after the cold rolling is not more than 0.30 mm.

* * * * *

UNITED STATES PATENT AND TRADEMARK OFFICE
CERTIFICATE OF CORRECTION

PATENT NO. : 11,404,189 B2
APPLICATION NO. : 16/617262
DATED : November 26, 2019
INVENTOR(S) : Tomoyuki Okubo et al.

It is certified that error appears in the above-identified patent and that said Letters Patent is hereby corrected as shown below:

In the Claims

Column 2, Line 20, In Claim 1, Line 16, "2.0 m" should read --2.0 µm--.

Signed and Sealed this
Eleventh Day of July, 2023

Katherine Kelly Vidal
*Director of the United States Patent and Trademark Office*